(12) United States Patent
Zhang et al.

(10) Patent No.: US 9,465,435 B1
(45) Date of Patent: Oct. 11, 2016

(54) SEGMENTATION OF A VIDEO BASED ON USER ENGAGEMENT IN RESPECTIVE SEGMENTS OF THE VIDEO

(71) Applicant: Google Inc., Mountain View, CA (US)

(72) Inventors: Kun Zhang, Union City, CA (US); Yu He, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/975,974

(22) Filed: Aug. 26, 2013

(51) Int. Cl.
| | |
|---|---|
| *G06F 3/01* | (2006.01) |
| *H04N 21/25* | (2011.01) |
| *H04N 21/258* | (2011.01) |
| *H04N 21/422* | (2011.01) |
| *H04N 21/4223* | (2011.01) |
| *H04N 21/45* | (2011.01) |
| *H04N 21/658* | (2011.01) |
| *H04N 21/845* | (2011.01) |
| *H04N 21/8549* | (2011.01) |

(52) U.S. Cl.
CPC ............ *G06F 3/01* (2013.01); *H04N 21/252* (2013.01); *H04N 21/25883* (2013.01); *H04N 21/4223* (2013.01); *H04N 21/42201* (2013.01); *H04N 21/42202* (2013.01); *H04N 21/42203* (2013.01); *H04N 21/4532* (2013.01); *H04N 21/6582* (2013.01); *H04N 21/8456* (2013.01); *H04N 21/8549* (2013.01)

(58) Field of Classification Search
CPC ............ H04N 21/252; H04N 21/25883; H04N 21/422; H04N 21/8549; H04N 21/4532; H04N 21/4788; H04N 21/6582; H04N 21/8456; H04N 21/42201; H04N 21/42202; H04N 21/4223; H04N 21/42203; G06F 3/01
See application file for complete search history.

(56) References Cited

U.S. PATENT DOCUMENTS

| | | | |
|---|---|---|---|
| 7,320,137 B1 * | 1/2008 | Novak et al. ................. | 725/134 |
| 2005/0028219 A1 * | 2/2005 | Atzmon et al. ............... | 725/116 |
| 2006/0218573 A1 * | 9/2006 | Proebstel ........................ | 725/14 |
| 2008/0250023 A1 * | 10/2008 | Baker et al. .................... | 707/10 |
| 2009/0183220 A1 * | 7/2009 | Amento et al. ............... | 725/120 |
| 2012/0082431 A1 * | 4/2012 | Sengupta et al. ............. | 386/241 |
| 2013/0205314 A1 * | 8/2013 | Ramaswamy ... | H04N 21/44213 725/14 |
| 2013/0268955 A1 * | 10/2013 | Conrad et al. ................. | 725/12 |

* cited by examiner

*Primary Examiner* — Randy Flynn
(74) *Attorney, Agent, or Firm* — Byrne Poh LLP

(57) ABSTRACT

Systems and methods for segmenting a video based on user engagement in respective segments of the video are presented. In one or more aspects, a system is provided that includes an engagement component configured to receive information regarding respective engagement of a plurality of users in connection with respective segments of a video. The system further includes an analysis component configured to analyze the information and calculate user engagement scores for the respective video segments, wherein the user engagement scores reflect level of the plurality of users' interest regarding the respective video segments, and an identification component configured to identify a subset of the video segments associated with relatively higher user engagement scores in comparison to other video segments.

20 Claims, 15 Drawing Sheets

Average User Engagement Scores for Video "ABC"

| ACTIVITY | WEIGHT | S1 | S2 | S3 | S4 | S5 | S6 |
|---|---|---|---|---|---|---|---|
| Seek Forward | -1 | 10 | 0 | 0 | 4 | 2 | 1 |
| Seek Backward | 1 | 0 | 2 | 2 | 1 | 0 | 3 |
| Fast Forward | -0.5 | 6 | 0 | 0 | 3 | 6 | 4 |
| Rewind | 0.5 | 0 | 2 | 5 | 0 | 1 | 1 |
| Bookmark | 2 | 0 | 1 | 2 | 0 | 0 | 0 |
| Comment | 2 | 1 | 1 | 2 | 4 | 1 | 0 |
| Stop/Pause | -2 | 0 | 0 | 4 | 2 | 0 | 0 |
| Resume | 2 | 0 | 0 | 1 | 1 | 1 | 1 |
| Total Engagment | | -15 | 5 | 6.5 | 1.5 | -0.5 | 1.5 |

SEGMENTATION OF A VIDEO BASED ON USER ENGAGEMENT IN RESPECTIVE SEGMENTS OF THE VIDEO

TECHNICAL FIELD

This application generally relates to systems and methods for segmenting a video based on user engagement in respective segments of the video.

BACKGROUND

The proliferation of available streaming content is increasing at exponential levels that will soon reach many millions if not billions of such viewable streaming content. Conventionally, broadcast media has been provided by television or cable channels that typically have been provided by a relatively small number of content providers. However, with the ubiquitous nature of media creation and publishing tools, individuals are able to become productive content creators. This has resulted in exceptional growth of available streaming media content.

In order to generate information about media content, such as information that facilitates searching for the media content and receiving applications related to unique features of respective media content, the media content should be to be analyzed at a content level. Manual analysis of media content is highly inefficient considering the large body of available media content. Automatic video analysis techniques can provide some relief. For example, automatic video content analysis techniques observe patterns in object movement and employ visual image recognition techniques to discern what activity is occurring in respective frames of the video. However, various features associated with video content such as how certain audiences interpret aspects of a video cannot be captured by current automatic video analysis techniques.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 2 presents an example table calculation for determining average user engagement scores for respective segments of a video in accordance with various aspects and embodiments described herein;

DETAILED DESCRIPTION

Figure 1:
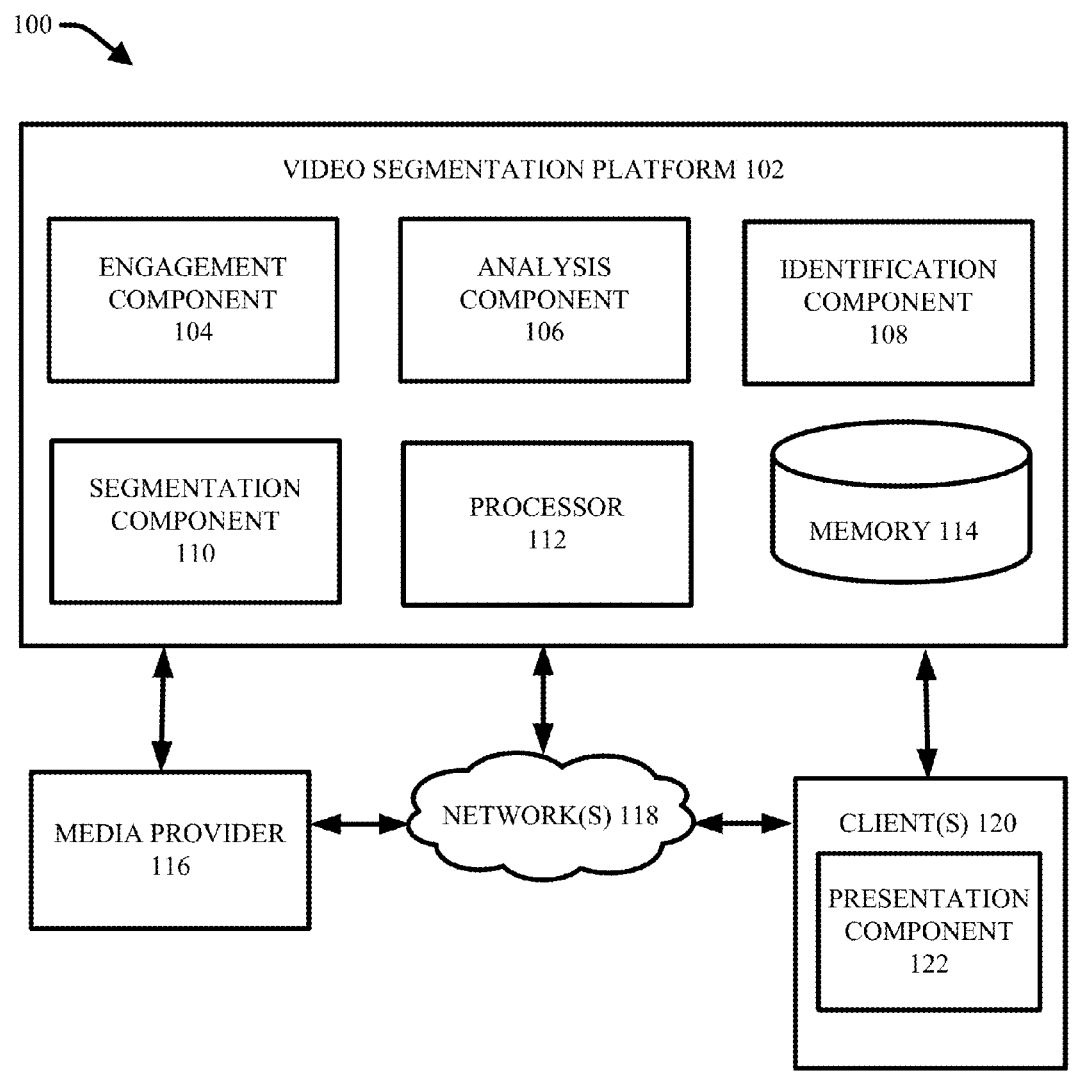
FIG. 1 illustrates an example system for segmenting a video based on user engagement in respective segments of the video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for segmenting a video based on levels of user engagement in respective segments of the video. As a user watches a video, the user can provide various clues that are indicative of whether the user finds a particular portion or part of the video interesting or not. For example, as a user watches a video, the user may fast forward past parts of the video the user finds uninteresting in order to arrive at an interesting portion of the video. A user can also perform various other actions that can indicate interest in a particular portion of a video. For example, a user may rewind back to interesting parts of a video, comment on interesting parts of a video, re-watch interesting parts of a video, or share links to interesting parts of a video. A user can also perform various actions that indicate disinterest in certain parts of a video. For example, the user may stop watching a video upon occurrence of a disinteresting part or provide comments indicating disinterest in a particular portion of the video.

In an aspect, a video segmentation system receives and analyze signals, such as those exemplified above, related to user engagement with respective parts of a video. For example, hundreds of users can watch the same video and each of the users can provide signals indicative of their respective levels of engagement in respective parts of the video. By analyzing information received from a plurality of users, the video segmentation system can calculate average levels of user engagement in the respective parts of a video. The video segmentation system can then segment the video based on the average levels of user engagement in the respective parts of the video. For example, the video segmentation system can cut a video into different segments where each segment is associated with a distinguishable average level of user engagement.

Information regarding average levels of user engagement in respective segments of a video can provide a good indication of what parts of the video most users (e.g., or users of a particular sample size and/or sample type) find interesting and what parts of the video many users find disinteresting. Various systems can employ this information to generate and provide media content to users that captures their attention. For example, a thumbnail generation system can generate thumbnail representations of a video using images from segments in the video associated with relatively high user engagement levels. In another example, a video content analysis system can focus on analyzing segments of a video associated with relatively high user engagement levels to understand what the video is about and develop a synopsis of the video while expending less energy and resources analyzing segments of the video associated with relatively low user engagement levels. In another example, a recommendation system can recommend segments of a video associated with relatively high user engagement levels as opposed to recommending the entire video. In yet another example, a video generation system can automatically generate a summary video for a video (e.g., a trailer) using segments of the video associated with relatively high user engagement levels. Further, the number of segments of a video associated with relatively high user engagement levels and degree of user engagement levels associated with the respective segments can influence manner in which a video is ranked and rendered in a search result. Advertising systems can also associate advertisements with segments of a video associated with relatively high user engagement levels.

In one or more aspects, a system is provided that includes an engagement component configured to receive information regarding respective engagement of a plurality of users in connection with respective segments of a video. The system further includes an analysis component configured to analyze the information and calculate user engagement scores for the respective video segments, wherein the user engagement scores reflect level of the plurality of users' interest regarding the respective video segments, and an identification component configured to identify a subset of the video segments associated with relatively higher user engagement scores in comparison to other video segments.

In another aspect, a method is disclosed that includes using a processor to computer executable instructions stored in a memory to perform acts including receiving information regarding respective engagement of a plurality of users in connection with respective segments of a video and calculating user engagement scores for the respective video segments based on the information, wherein the user engagement scores reflect level of the plurality of users' interest regarding the respective video segments. The method further includes identifying a subset of the video segments associated with relatively higher user engagement scores in comparison to other video segments.

Further provided is a tangible computer-readable storage medium comprising computer-readable instructions that, in response to execution, cause a computing system to perform various operations. The operations include at least, receiving information regarding respective engagement of a plurality of users in connection with respective segments of a video, calculating user engagement scores for the respective video segments based on the information, wherein the user engagement scores reflect level of the plurality of users' interest regarding the respective video segments, and identifying clusters of adjacent segments that are associated with similar user engagement scores.

Referring now to the drawings, with reference initially to FIG. 1, presented is a diagram of an example system 100 for segmenting a video based on levels of user interest in respective segments of the video, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes video segmentation platform 102, media provider 116, and one or more client devices 120. System 100 also employs one or more networks 118 for connecting the one or more client devices 120 with video segmentation platform 102 and/or media provider 116. Video segmentation platform 102 can include engagement component 104, analysis component 106, identification component 108 and segmentation component 110. Video segmentation platform 102 includes memory 114 for storing computer executable components and instructions. Video segmentation platform 102 further includes a processor 112 to facilitate operation of the instructions (e.g., computer executable components and instructions) by video segmentation platform 102.

Video segmentation platform 102 is configured to analyze a video and divide the video into segments based on levels of user interest in the respective segments. As used herein, the term segment is used to refer to a portion of a video less than the entire video. For example a video can be divided into a plurality of small segments (e.g., small segments having one second duration, two second duration, a five second duration, etc). Further, each of the small segments can be grouped or clustered into a plurality of larger segments (e.g., segments having five second duration, ten second duration, sixty second duration, etc.). In another example, a video can be divided into two or more segments where each segment has different durations (e.g., 60 minute video can be divided into a first segment of 20 minutes and a second segment of 40 minutes). In some aspects, a video can include a plurality of frames and each frame can be considered a segment of the video. In yet another aspect, a segment of a video can include multiple frames of video.

In an aspect, videos analyzed and segmented by video segmentation platform 102 are associated with media provider 116. Media provider 116 can include an entity that provides media content (e.g., video, streaming video, images, thumbnails or other static representations of video) to client device(s) 120 via a network 118 (e.g., the Internet). Client device 120 can include presentation component 122 to generate a user interface (e.g., a graphical user interface or virtual interface) that displays media content provided by media provider 116 to a user of the client device. In an aspect, presentation component 122 can include an application (e.g., a web browser) for retrieving, presenting and traversing information resources on the World Wide Web. For example, media provider 116 can provide and/or present media content to client device 120 via a website that can be accessed using a browser of the client device 120. In an aspect, the media content can be presented and/or played at client device 120 using a video player associated with media provider 116 and/or client device 120. As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

In an aspect, media provider 116 can employ one or more networked computing devices to store media content and deliver media content to users via a network 118. The media content can be stored in memory associated with media provider 116 and/or at various networked devices employed by media provider 116 and accessed via client device 120 using a web based platform of the media provider 116. For example, media provider 116 can include a media presentation source that has access to a voluminous quantity (and potentially an inexhaustible number) of shared media (e.g., video and/or audio) files. The media presentation source can further stream these media files to one or more users at respective client devices 120 of the one or more users over a network 118. In another example, media provider 116 can include any entity that provides videos to users along with other content and services (e.g., a social networking website that provides social networking services and social videos or an educational website that provides educational videos and services).

In another aspect, media provider 116 can include an entity that provides media content affiliated with and stored by another media source or media provider. According to this example, media content provided by media provider 116 can be stored by and affiliated with another media provider/source (not shown) accessible to media provider 116 via a network (e.g., network 118). For example, media provider 116 can include a social networking website or other type of networked content provider that provides links to videos or includes embedded videos provided by another media provider/source (not shown), such as a media presentation source that has access to a voluminous quantity (and potentially an inexhaustible number) of shared media (e.g., video and/or audio) files.

Client device 120 can include any suitable computing device associated with a user and configured to interact with media provider 116, and/or video segmentation platform 102. For example, client device 120 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 100 (or additional systems described in this disclosure) using client device 120.

Network(s) 118 can include wired and wireless networks, including but not limited to, a cellular network, a wide area network (WAD, e.g., the Internet), a local area network (LAN), or a personal area network (PAN). For example, client device 120 can communicate with video segmentation platform 102 and/or media provider 116 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks. In another aspect, media provider 116 can include video segmentation platform 102. According to this aspect, client devices 120 can communicate with media provider 116 via a network 118 to view and interact with media provided by the media provider and to provide information to video segmentation platform 102 regarding engagement in respective segments of a video.

To facilitate segmenting a video based on levels of user engagement in respective segments of the video, video segmentation platform 102 can include engagement component 104, analysis component 106, identification component 108 and segmentation component 110.

Engagement component 104 is configured to receive information regarding user engagement in respective segments of a video. Engagement component 104 can receive such user engagement information for a plurality of users. In an aspect, information regarding user engagement in respective segments of a video is collected and generated by an external system or device. The information is further provided to engagement component 104 by the external system or device. In another aspect, engagement component 104 can collect information regarding user engagement with respective segments of a video. In an aspect, information regarding user engagement in respective segments of a video is collected (e.g., by engagement component 104 or an external device) as the video is consumed by the user. In particular, as a user watches a video, the user can provide various signals regarding whether the user is engaged with the video and the level of user engagement with the video. These signals are referred to herein as user engagement signals.

In an aspect, user engagement signals include signals associated with control over the playing of a video by a user. For example, video players can provide various tools to users for controlling the playing of a video, including but not limited to: a tool to play the video, a tool to stop the playing of a video, a tool to pause the playing of a video, a tool to seek forward in the video (wherein the term seek forward refers to skipping over section of the video moving forward), a tool to seek backward in the video (wherein the term seek backward refers to skipping over section of the video moving backward), a tool to fast forward the video, a tool to rewind the video and a tool to adjust the volume of the video.

Various manners in which controls tools are applied to a video by a user can indicate different levels of engagement with different parts of the video. For example, stopping the playing of a video at a particular part can indicate that the user has lost interest in the video at or near that part. Seeking forward and/or fast forwarding past certain segments of a video can indicate that the user is not engaged by those certain segments. However, seeking forward or fast forwarding to a specific part of a video can indicate engagement with the specific part of the video. Similarly, seeking backward or rewinding past parts of a video can indicate a level of disinterest or disengagement with those parts of the video. However, a part of a video a user seeks backward or rewinds too is likely considered interesting by the user. In another example, re-watching or replaying certain parts of a video can provide a good indication of engagement with those parts of the video. Pausing a video at a particular part and then resuming playing of the video at that part can further indicate relatively high level of engagement or interest with that part. In yet another example, muting or reducing the volume of a first part of a video can indicate a level of disengagement with the first part while increasing the volume of a second part of the video can indicate a level of engagement with the second part.

Accordingly, engagement component 104 can collect and/or receive user engagement signals associated with various control mechanisms applied to a video by a user and the particular parts of a video affected by the respective control mechanisms. For example, engagement component 104 can collect/receive user engagement signals including but not limited to: segments of a video at which a user stops the playing of the video, segments of a video at which a user pauses a video, segments of a video at which a user resumes playing of a paused video, segments of a video a user rewinds or fast forward past, segments of a video a user seeks forward or backward past, segments of a video a user rewinds or fasts forward to, segments of a video a user seeks backward or seeks forward to, segments of a video a user re-watches and number of times the user re-watches, segments of the video a user increases the volume of, and segments of a video a user decreases the volume of.

It should be appreciated that the above noted control mechanisms and associated effects of the control mechanisms with respect to providing indication of user interest in certain parts of a video are merely exemplary. Various additional mechanisms related to controlling the playing of a video that can vary with respect to video processing and rendering technologies (e.g., transferring or sharing playing of a video between devices in real time). Such additional control tools and effects which may provide an indication of user engagement in respective segments of a video are considered within the spirit of the subject disclosure.

In another aspect, engagement component 104 can collect/receive user engagement signals associated with user feedback on particular parts or segments of a video. User engagement signals associated with user feedback can include but are not limited to: commenting on a part of a video, bookmarking a part of a video, tagging a part of a video (e.g., with a thumbs up or a thumbs down signal), or sharing a part of a video. For example, as a user watches a video, the user may come across an interesting seen that prompts the user to post a comment about that scene on public forum. According to this example, if the user is watching the video on his or her computer via a video sharing website, the user can post a comment regarding the interesting section of the video at a forum associated with the video sharing website. Also, according to this example, if the user is watching the video on a television, the user can post a comment at a social networking website user his or her smartphone. The user may also tag the scene with signals that indicates an interest or disinterest in the scene (e.g., provide a thumbs up or thumbs down tag for the scene). In another example, the user may share a link to the video upon occurrence of an interesting scene in the video. In an aspect, the link can be configured to cause the video to initiate playing at the interesting scene. The user can also share a link to the interesting segment of the video as extracted from the whole video.

In an aspect, user engagement signals associated with user feedback can be collected or received by engagement component 104 as they are generated. In another aspect, engagement component 104 can collect/receive user engagement signals associated with user feedback after it is generated. For example, engagement component 104 can search through public forums to find comments regarding particular parts of a video or examine a user's watch history to find parts of videos that the user has bookmarked.

In an aspect, engagement component 104 can receive user engagement signals gathered by an input tool associated with a client device 120 at which a video is played, and/or associated with a client device at which a video is played, regarding user engagement with the video. According to this aspect, information regarding user engagement with segments of a video can be collected using sensory tools associated with a client device at which the video is played and/or an auxiliary device. For example, client device 120 (or an auxiliary device) can include gaze detection hardware and/or software configured to determine whether a user is looking at a video displayed at the client device 120. According to this example, as a user is watching a video, engagement component 104 can receive user engagement signals that provide information indicating what segments of a video the user is looking at and what segments of the video the user is not looking at. More specifically, engagement component 104 can receive information regarding what segments of a video cause a user who is looking away to resume looking at the video and what segments of a video cause a user to lose interest and look away from the video.

In another example, client device 120 (or an auxiliary device) can include a microphone that receives and interprets user engagement signals representative of sounds caused by a user while watching a video. According to this example, user engagement signals can include information indicating when a user screams or yelps at a part of a video, when a user cheers at a part of a video, when a user laughs at a part of a video, when a user cries at a part of a video, etc. This information is further indicative of whether the user is engaged in a particular part of the video. For example, screaming at a certain part of a scary movie can provide a strong indication that the user who is screaming is engaged in the certain part of the movie.

In an aspect, engagement component 104 can and/or client device 120 (or an auxiliary device) can employ voice to text software and/or hardware to interpret words spoken by a user. For example, as a user is watching a particular part of a video with a friend, the user may ask questions about the particular part of the video or discuss the particular part of the video with the friend. This activity by the user can indicate the user is engaged in the particular part of the video. In another example, as a user is watching a video with a friend, the user may carry on a conversation about his or her dinner they cooked earlier in the evening, a conversation entirely irrelevant to the subject matter of the video. Such user activity can provide an indication that the user is not interested in the video during the particular segment of the video he or she is talking about the dinner he or she cooked. According to this aspect, engagement component 104 can receive and analyze words spoken by a user while watching a video. The particular words spoken by a user at a particular part in a video can later be analyzed by video segmentation platform 102 (e.g., using analysis component 106) to facilitate determining level of user engagement with the particular part of the video.

Engagement component 104 can also receive user engagement signals related to movement of a user with respect to a client device 120 at which a video is being played. According to this aspect, client device 120 can include motion and/or proximity sensors configured to detect and interpret user movement. Various types of user movements during watching a video can provide indication of user engagement or disengagement with the video. For example, engagement component 104 can receive information indicating when a user leaves and returns to the room in which a video is being played at client device 120. According to this example, the user movement information can indicate level of user disinterest in the part of the video being played at the time the user leaves the room and a level of interest in the part of the video occurring at the point of the user returns to the room In another example, engagement component 104 can receive information indicating when a user moves closer to (e.g., leans in to watch intently, providing an indication of user engagement) or away from a display screen (e.g., providing an indication of user disengagement) at which a video is being played during the course of the video. In yet another example, engagement component 104 can receive information regarding when a user jumps in excitement in response to a part in a video (indicating user engagement) or falls asleep during a certain part of a video (indicating user disengagement).

In some aspects, a user can watch a video on a handheld client device 120 (e.g., a smartphone or tablet PC). According to these aspects, the handheld client device can include motion and/or positional sensors that detect movement of the device and engagement component 104 can receive information regarding movement of the handheld device at which a video is being played. This information can also be received and interpreted by engagement component 104 as user engagement signals (e.g., information that provides an indication of whether a user is engaged or disengaged in certain parts of a video). For example, if a user is walking and watching a video on his or her smartphone, the user may stop walking to intently watch a part of the video that grabs his or her attention (indicating user engagement). In another example, if a user is holding his or her phone upside during a part of the video, this is a good indication the user is not paying attention to the part of the video.

Engagement component 104 can further collect or receive user engagement signals relating to visibility of a video player to a user at an interface of a client device 120. Often times, although a video may be open and playing at a client device 120, the video may not be visible to the user. For example, a user interface displaying a video may include several open windows and/or tabs that may cover a video player entirely or partially. In another example, a window in which a video is displayed may be minimized or maximized. Information indicating whether a video is visible to a user during the playing of certain parts or segments can further indicate whether the user is engaged in the certain parts or segments of the video.

For example, a user may have a video playing in a first window and have word processing application open in another window. The user may further switch between maximizing and minimizing the window with the video and the window with the word processing application based on when the user is engaged in a part of a video. For example, a user may have the video window maximized during a first part of a video. When the user loses interest in the first part of the video, the user may minimize the video window and maximize the word processing application window instead. This information can be received by engagement component 104 and provide an indication that the user finds the part of the video occurring while the video window is minimized, disengaging. Thus in an aspect, engagement component 104 can receive user engagement signals related to visibility of a video to a user at a given point in the video based on the arrangement of and configuration of objects displayed at the user interface at which the video is displayed.

Analysis component 106 is configured to analyze information received or collected by engagement component 104 and determine levels of user engagement associated with respective parts or segments of a video. In particular, analysis component 106 can analyze user engagement signals associated with different parts or segments of a video from a plurality of users and determine average user engagement levels associated with the different parts or segments of the video. For example, analysis component 106 can examine user engagement signals associated with a first part of a video and a second part of a video and determine which part of the video is associated with a higher level of user engagement.

Analysis component 106 can employ various algorithms and/or look-up tables stored in memory 114 that relate the various user engagement signals described above to levels of user engagement. For example, analysis component 106 can employ an algorithm that applies different weights to user engagement signals that reflect varying degrees of engagement and disengagement. In an aspect, analysis component 106 can divide a video into a plurality of sequential small segments of equal length (e.g., one frame, two frames, one second, two seconds, etc) and employ one or more algorithms and/or look-up tables to calculate an average user engagement level score for each small segment based on user engagement signals associated with each small segment received from a plurality of users.

For example, FIG. 2, provides an example table calculation 200 employed by analysis component 106 for determining average user engagement scores for respective segments of a video entitled "ABC." According to this example, analysis component 106 divided video ABC into six segments of equal length, segments S1-S6. It should be appreciated that a video can be divided into any suitable number N (N is an integer) of segments and analysis of video ABC is described using six segments merely for exemplary purposes. For example, a video having 200 frames can be divided into 200 segments, a video having 1000 frames can be divided into 1000 segments, a video lasting 3600 seconds can be divided into 1800 segments, etc.

In this example, analysis component 106 employs table calculation 200 that calculates average user engagement based on received user engagement signals associated with seeking forward, seeing backward, fast forwarding, rewinding, bookmarking commenting, stopping/pausing and resuming video ABC with respect to each segment S1-S6. As seen in table calculation 200, analysis component 106 applies an assigned weight to each user engagement signal type that reflects level a user engagement associated with that user engagement signal type (e.g., activity seek forward has a weight of −1, activity seek backward has a weight of 1, activity fast forward has a weigh of −0.5, activity rewind has a weight of 0.5, activity bookmark has a weight of 2, activity comment has a weight of 2, activity stop/pause has a weight of −2 and activity resume has a weight of 2). In table calculation 200, analysis component applies positive weighted values to activities that reflect user engagement and negative weighted values to activities that reflect user disengagement. It should be appreciated that the weights applied to the respective user engagement signal types in table calculation 200 are merely exemplary and not indented to reflect or restrict alternative weighted values to apply to the respective signal types.

Analysis component 106 can determine number of signal occurrences in each segment S1-S6 based on information gathered from a plurality of users. For example, in table calculation 200, segment S1 is associated with user engagement signals indicating ten users seeked forward past segment S1. Based on number of occurrences of respective user engagement signal types and weighted values associated with each user engagement signal type, analysis component 106 can calculate average user engagement scores to associate with each segment. With reference to table calculation 200, for each segment S1-S6, analysis component multiplies the number of occurrences of a signal type by its assigned weight to obtain multiplied output values (not shown). The total user engagement score for a particular segment S1-S6 is then equal to the summation of multiplied output values for the respective segments. For example, in table calculation 200 segment S1 received an average total engagement score of −15, segment S2 received a score of 5, segment S3 received a score of 6.5, segment S4 received a score of 1.5, segment S5 received a score of −0.5, and segment S6 received a score of 1.5. By looking at calculation table 200, in this example, it is clear that segment S1 was found most disengaging or disinteresting to the sampled users and segment S3 was found most engaging or interesting to the sampled users.

Referring back to FIG. 1, analysis component 106 is configured to analyze user engagement signals received from a plurality of users to determine average user engagement levels associated with respective segments of a video. For example, analysis component 106 can analyze user engagement signals associated with respective segments of a video sampled from hundreds to thousands (or any number N of users where N is an integer) of users. It should be appreciated that some user may not watch a whole video. Accordingly, signals associated with each segment of a video may not be reflective of an entire user sample.

In an aspect, analysis component 106 can analyze user engagement signals associated with a group of users sharing a distinguishable characteristic (e.g., similar age, similar gender, similar ethnicity, etc). For example, user engagement signals associated with segments of a video may vary depending on the type of users from which the user engagement signals were received (e.g., different groups of people may find different parts of a video more or less engaging). According to this aspect, video segmentation platform 102 can observe variances between different types of users with respect to parts of a video the different types of users find engaging or not.

For example, analysis component 106 can analyze user engagement signals for a first sample of users representative of a first demographic and second sample of users representative of a second demographic. The first sample of users can include users under the age of 13 and the second sample of users can include users over the age of 13. Based on different sets of user engagement signals received for the first and second samples of users, analysis component 106 may calculate different user engagement scores for respective video segments. For example, analysis component 106 may calculate a higher level of user engagement for segment number 51 for the older demographic sample of users where segment 51 includes a mature joke that the younger demographic does not tend to understand. Analysis component 106 can organize users into different samples based on a variety of criteria. Such criteria can include but is not limited to: user demographics, user preferences, user interests, and user social circles.

Identification component 108 is configured to identify segments of a video associated with relatively higher user engagement levels than other segments of the video based on analysis and calculations performed by analysis component 106. For example, with respect to table calculation 200 in FIG. 2, identification component 108 can identify that segment S3 is associated with the highest level of user engagement, followed by segment S2, followed by segments S4 or S6. Identification component 108 can further identify segment 51 as being associated with the highest level of user disengagement and segment S5 as being associated with a lower level of user disengagement.

Identification component 108 can apply various statistical analysis mechanisms to characterize and organize video segments based on their respective user engagement scores. In an aspect, identification component 108 can identify all segments of a video that receive user engagement scores above a threshold value. The threshold value can be selected based on the scale employed to calculate user engagement scores (e.g., a user engagement score of 10 or above) or based on a mean, mode, or standard deviation value associated with the array of user engagement scores for the respective segments of a video. In another aspect, identification component 108 can be configured to identify the top N segments (where N is an integer) having the highest user engagement scores.

Identification component 108 can further analyze user engagement level scores associated with sequential small segments of a video to identify groups or clusters of adjacent segments associated with similar user engagement scores. For example, identification component 108 can identify clusters of adjacent segments that have user engagement scores within a predetermined range of a segment included in the cluster having a maximum user engagement score. Identification component 108 can also determine which groups or clusters of small adjacent segments are associated with relatively higher user engagement scores than other clusters of small adjacent segments for the video.

Figure 3A:
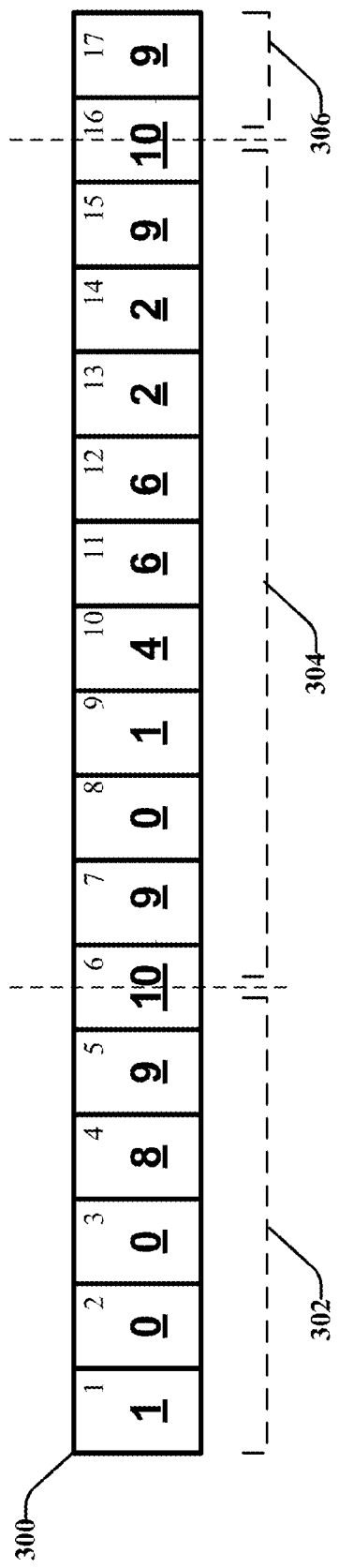
FIGS. 3A and 3B present example representations of a video divided into a plurality of sequential small segments where each segment is associated with an average user engagement score in accordance with various aspects and embodiments described herein.
Figure 3B:
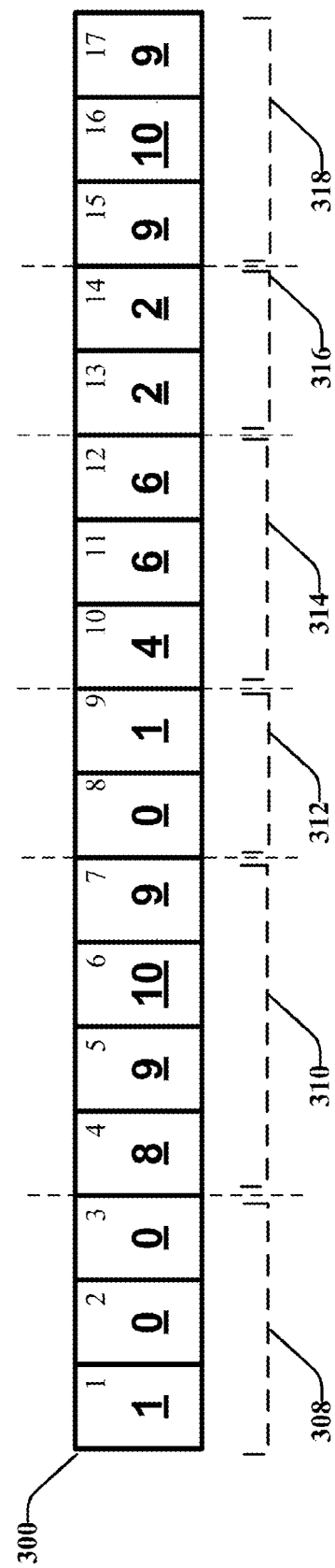

For example, FIGS. 3A and 3B, present example representations of a video 300 divided into a plurality of sequential small segments where each segment is associated with an average user engagement score as determined by analysis component 106. Video 300 is divided into 17 sequential segments numbered 1-17. The bolded number within each segment represents the segment's average user engagement score. In an aspect, each segment represents a frame of video. In FIG. 3A, identification component 108 identifies the two segments with the highest user engagement scores, segments 6 and 16, each having a user engagement score of 10.

In FIG. 3B, identification component 108 identifies clusters of adjacent segments having similar user engagement scores. In an aspect, identification component 108 identifies groups of segments 1-3, 4-7, 8-9, 10-12, 13-14 and 15-17 based on respective user engagement scores included in each group having a user engagement score within a predetermined deviation of the mean user engagement score of the group. For example, segments 1-3 have a mean user engagement score of 1, segments 4-7 have a mean user engagement score of 9, segments 8-9 have a mean user engagement score of 1, segments 10-12 have a mean user engagement score of 14.67, segments 13-14 have a mean user engagement score of 2 and segments 15-17 have a mean user engagement score of 9.33. In another aspect, identification component 108 can identify clusters of small segments by identifying boundaries between the clusters where user engagement scores associated with respective segments vary significantly (e.g., by a predetermined deviation threshold value).

Referring back to FIG. 1, segmentation component 110 is configured to divide a video into respective sequential segments based on user engagement scores associated with different parts of the video. In particular, segmentation component 110 can segment a video into groups of small sequential segments based on user engagement scores associated with the respective small segments. Segmentation component 110 can employ various techniques to segment a video using user engagement scores associated with different parts of the video. In an aspect, segmentation component 110 can employ segments and/or clusters of segments identified by identification component 108 to facilitate segmenting a video.

For example, segmentation component 110 can cut a video into segments using the segments identified by identification component 108 as having relatively higher user engagement scores with respect to the other segments as center points. For example, with reference to FIG. 3A, segmentation component 110 can segment video 300 into segments 302, 304 and 306 by cutting the video at or near segments 6 and 16, where segments 6 and 16 have the top two user engagement scores. In another aspect, segmentation component can segment a video into sequential groups or clusters of segments having similar user engagement scores. For example, with reference to FIG. 3B, segmentation component 110 can segment video 300 into segments 308, 310, 312, 314, 316 and 318, where each of the segments 308, 310, 312, 314, 316 and 318 include two or more smaller segments identified by identified by identification component as having similar mean user engagement scores. Segmentation component 110 can further associate the mean user engagement scores for segments 308, 310, 312, 314, 316 and 318 with the respective segments. As a result, a video can be organized or divided into different segments of various lengths and each segment will be associated with a distinguishable level of average user engagement in the content of the segment.

Figure 4:
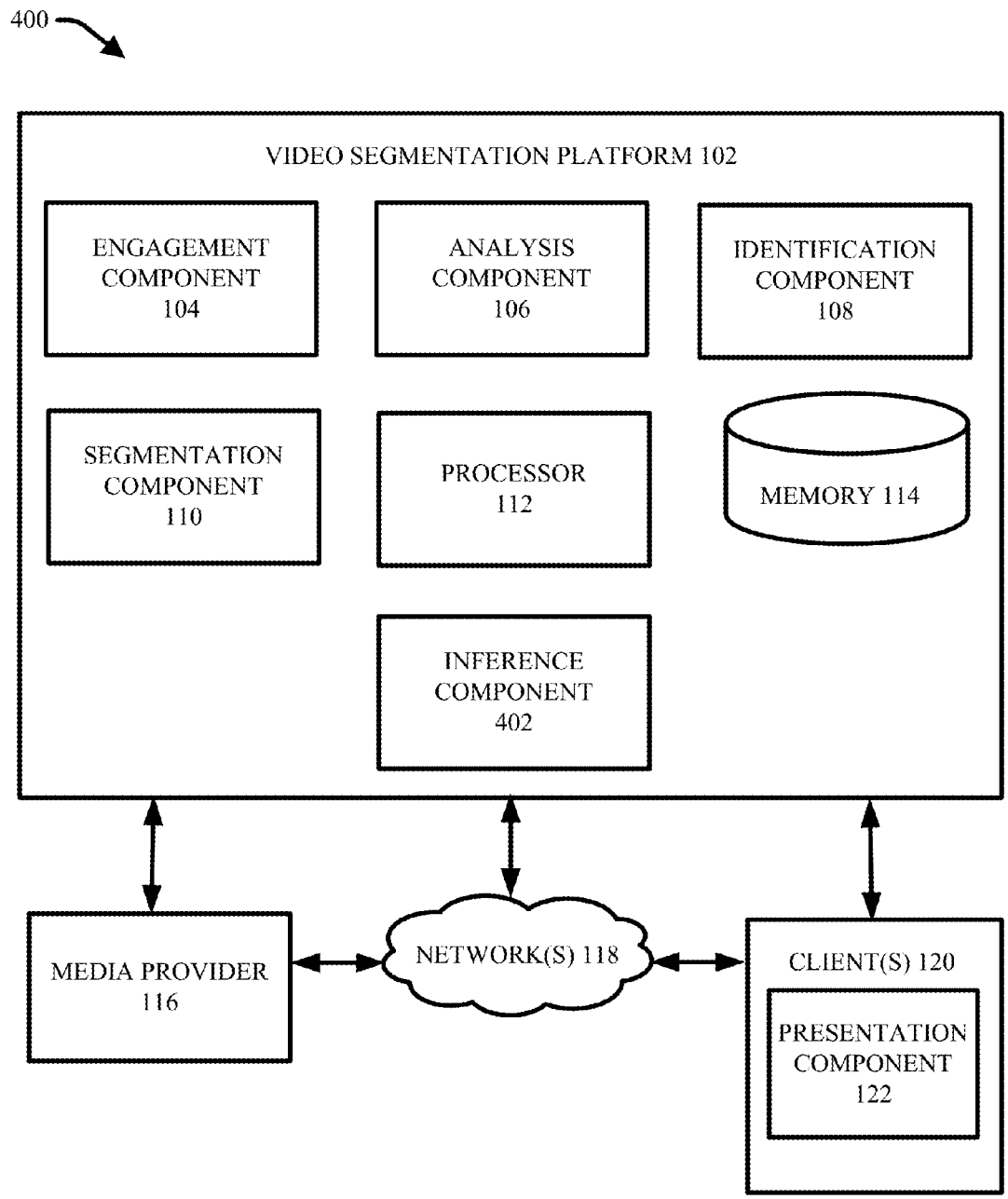
FIG. 4 illustrates another example system for segmenting a video based on user engagement in respective segments of the video, in accordance with various aspects and embodiments described herein.

FIG. 4 presents a diagram of another an example system 400 for segmenting a video based on user engagement levels in respective segments of the video, in accordance with various aspects and embodiments described herein. System 400 includes same features and functionalities of system 100 with the addition of inference component 402. Repetitive description of like elements employed in respective embodiments of systems and interfaces described herein are omitted for sake of brevity.

Inference component 402 is configured to provide for or aid in various inferences or determinations associated with aspects of video segmentation platform 102. In an aspect, all or portions of video segmentation platform 102 can be operatively coupled to inference component 402. Moreover, inference component 402 can be granted access to all or portions of video segmentation platform, media provider 116, client device 120, and other sources accessible via network 118.

In an aspect, analysis component 106 can employ inference component 402 to infer user engagement levels to associate with respective segments of a video based on received user engagement signals. For example, inference component 402 can analyze received information pertaining to user engagement and/or disengagement with a segment of a video to infer an average level of user engagement with the segment. In another aspect, identification component 108 can employ inference component 402 to infer which adjacent segments to cluster or group together based on the user engagement scores respectively associated therewith. Segmentation component 110 can also employ inference component 402 to infer manners to cut a video into different segments based on the user engagement scores associated with the various parts (e.g., smaller segments) of the video.

In order to provide for or aid in the numerous inferences described herein, inference component 402 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 5-8 present example systems that employ video segmentation platform to facilitate various actions related to generating and/or presenting media content that is predicted to engage users based on segments of videos associated with relatively high user engagement scores. The systems presented in FIGS. 5-8 include same or similar features and functionalities of other systems described herein. Each of the systems of FIGS. 5-8 include a new platform (e.g., a thumbnail generation platform, a video content analysis platform, a recommendation platform and a preview generation platform, respectively), that includes video segmentation platform 102. The new platforms are further connected to media provider 116 and client(s) 120 via a network 118. However, in various aspects, the new platforms can be remote from video segmentation platform 102 and access video segmentation platform via a network 118. In addition, media provider 116 can include both the new platforms and video segmentation platform 102. Repetitive description of like elements employed in respective embodiments of systems and interfaces described herein are omitted for sake of brevity.

Figure 5:
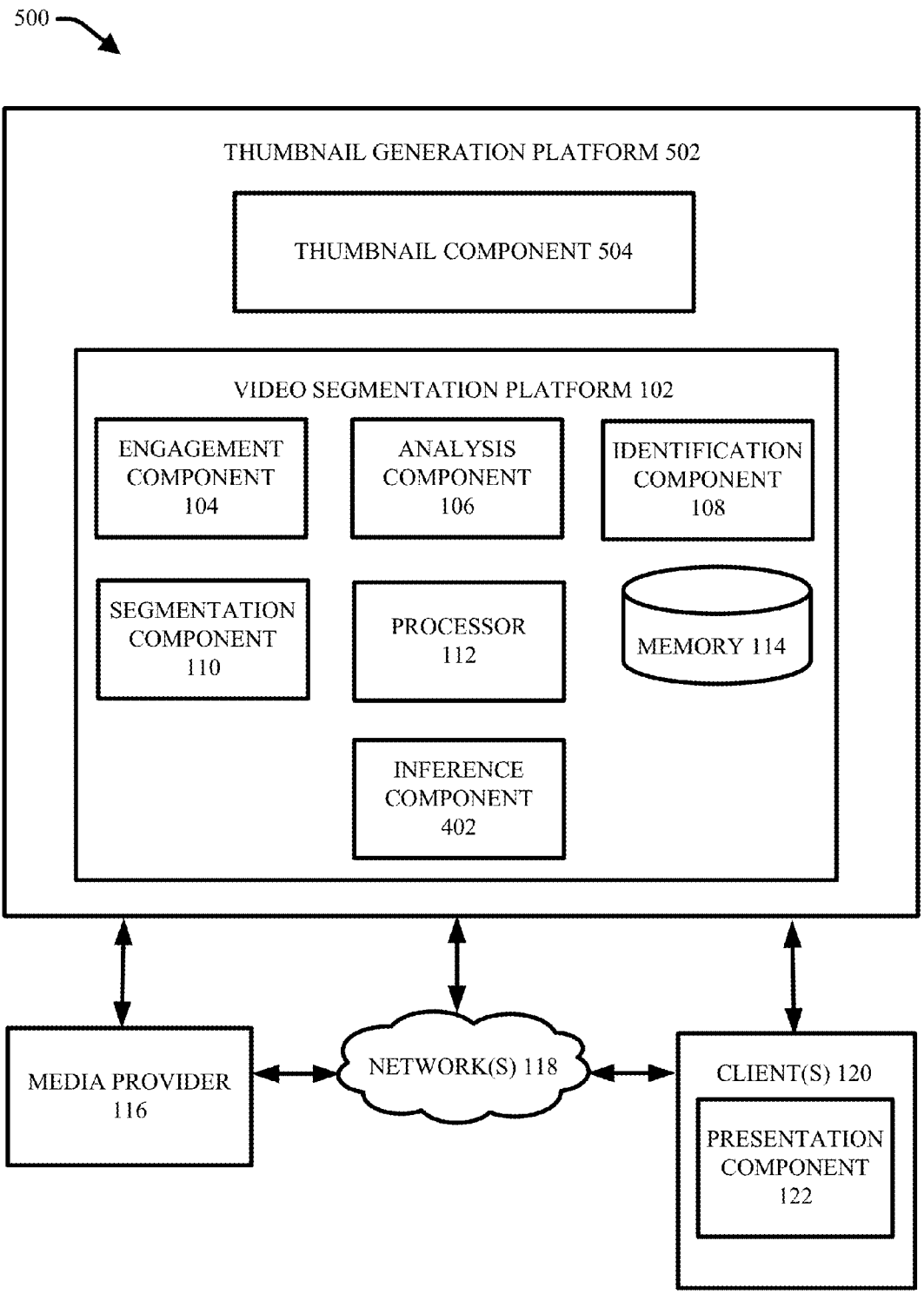
FIG. 5 illustrates an example system that facilitates generating thumbnails for videos based on user engagement scores associated with respective segments of the videos in accordance with various aspects and embodiments described herein.

With reference to FIG. 5, presented is a system 500 that facilitates generating thumbnails for videos based on user engagement scores associated with respective segments of the videos. System 500 includes a thumbnail generation platform 502 that includes video segmentation platform 102. Thumbnail generation platform 502 includes a thumbnail component 504 configured to analyze a segmented video and generate one or more thumbnail images for the video based on segments of the video associated with relatively higher user engagement scores.

A thumbnail for a video is a picture or image that is intended to represent the contents of the video. In other words, a thumbnail for a video is an image taken from or associated with the video that provides users a snapshot of the video. A video essentially is made up of a series of images. Depending on size of a video and camera used to record the video, the number of images included in the video can be extremely large. Parsing through each image manually to find images to employ as thumbnails can be a tedious task. Further, automated techniques that select the first image of a video to employ as a thumbnail for the video or that randomly select an image from a video to employ as a thumbnail for the video, result in the generation of thumbnails that may not serve as a good representation of the video.

Thumbnail component 504 is configured to generate one or more thumbnail images for a video using one or more images included in a segment of the video associated with a relatively higher user engagement value than other segments of the video. Thumbnail component 504 can be configured to generate any number N of thumbnails for a video, where N is an integer. In an aspect, thumbnail component 504 is configured to generate M thumbnails from the top M scored segments of a video (e.g., generate 3 thumbnails using images from the top three segments having the highest user engagement scores). For example, referring back to FIGS. 3A and 3B, thumbnail component 504 could chose to generate thumbnails using images from segments 6 and 16, or segments 310 and 318. In an aspect, where a segment of video includes several images, thumbnail component 504 can select the first image from the segment to use as a thumbnail image. For example, in FIG. 3B, segments 310 and 318 are associated with the highest average user engagement scores for video 300. Accordingly, thumbnail component 504 can select segments 310 and 318 as segments from which to generate thumbnails representative of video 300 and select an image from segment 4 and segment 15 to employ as the thumbnail images.

In an aspect, thumbnail component 504 can generate a different set of thumbnails for a video where each set of thumbnails are associated with a different user type. For example, the thumbnails for video ABC presented to a user who is under the age of 13 can be different than the thumbnails for video ABC presented to a user who is over the age of 13 as a result of different segmentation and association of user engagement scores with segments of video ABC for the different user types.

Figure 6:
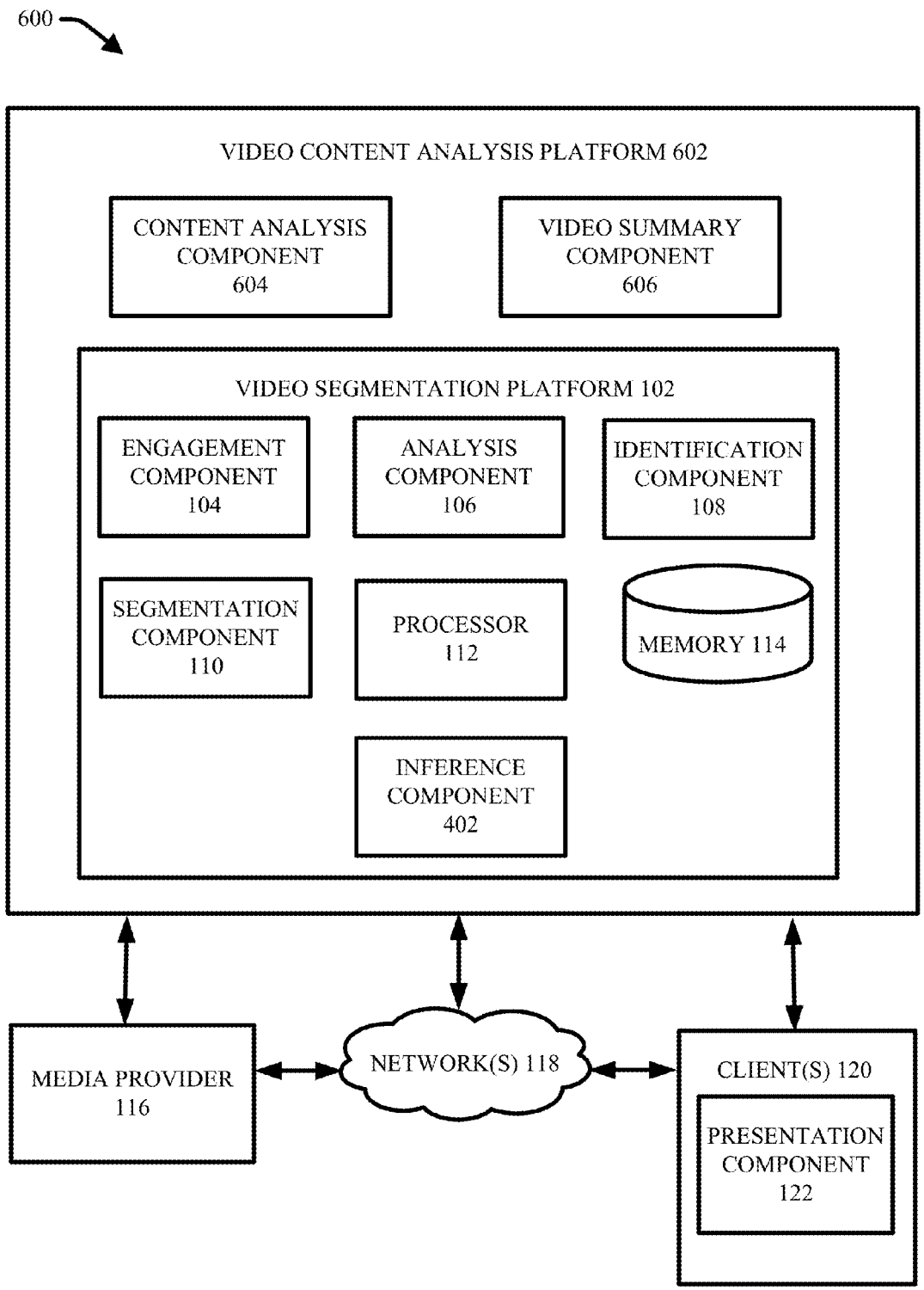
FIG. 6 illustrates an example system that facilitates analyzing content of a video based on user engagement scores associated with respective segments of the video in accordance with various aspects and embodiments described herein.

FIG. 6 presents a system 600 that facilitates analyzing content of a video based on user engagement scores associated with respective segments of the video. System 600 includes content analysis component 604 and video summary component 606. Automated video analysis is used to automatically identify features and aspects of a video. For example, automated video content analysis computer systems and software can analyze image movement patterns, employ facial recognition, or analyze sounds and words spoken in a video to facilitate determining or inferring what the video is about, what actions occur in the video, and what objects or persons are displayed in a video.

As the size of a video increases, automated video analysis becomes increasingly time and energy consuming Video content analysis platform 602 is configured to tailor automated video analysis to segments of a video associated with relatively higher user engagement scores than other segments of the video. In particular, content analysis component 604 can identify segments of a video associated with relatively high user engagement scores and perform video content analysis against those segments. Content analysis component 604 can further skip analysis of segments of the video associated with relatively low user engagement scores. Video summary component 606 can then automatically generate a summary of the video based on the analysis of the segments having the relatively higher user engagement scores.

Figure 7:
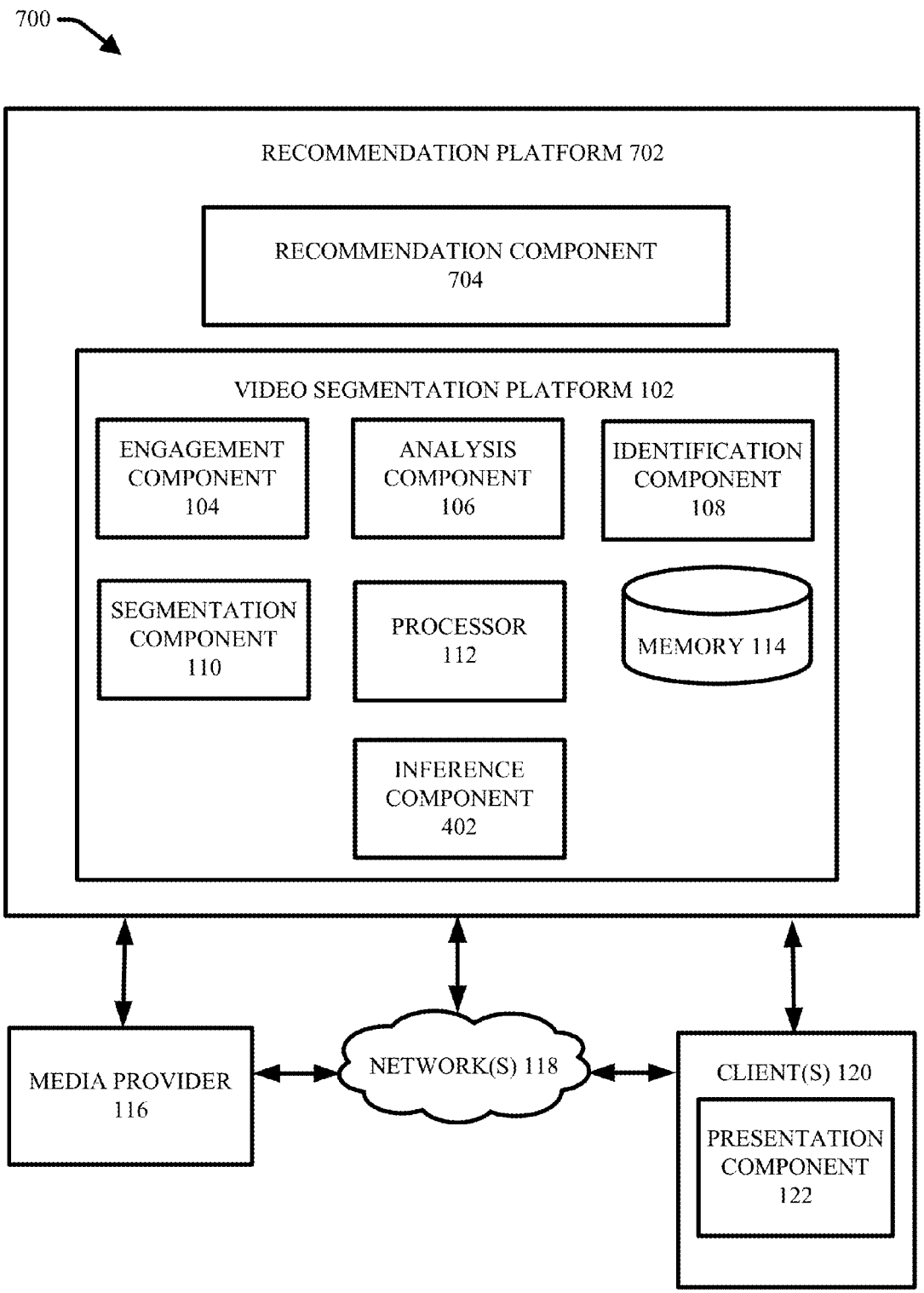
FIG. 7 illustrates an example system that facilitates recommending videos or segments of videos based on user engagement scores associated with respective segments of the videos in accordance with various aspects and embodiments described herein.

FIG. 7 presents a system 700 that facilitates recommending videos or segments of videos based on user engagement scores associated with respective segments of the videos. Video recommendation systems generally apply a variety of criteria and signals to identify videos to recommend to a user. For example, many video recommendation systems identify videos to recommend to a user that include content or characteristics that match the user's preferences or that have been frequently watched by other users sharing similar interests to the user. Recommendation platform 702 includes recommendation component 704 to employ information related to user engagement levels in respective segments of a video to facilitate recommending videos to a user.

In an aspect, recommendation component 704 can identify and recommend videos associated with a relatively higher percentage of engaging content with respect to non-engaging content. For example, recommendation component 704 can analyze a segmented video and determine an overall user engagement score for the video based on the number of segments of the video associated with relatively higher user engagement scores compared to the number of segments of the video associated with relatively lower user engagement scores. In another example, recommendation component 704 can sum the user engagement scores for respective segments of a video to calculate an overall user engagement score. The overall user engagement score can further reflect the length of the video. Recommendation component 704 can then recommend videos associated with higher overall user engagement scores over videos associated with lower overall user engagement scores. Overall user engagement scores for a video can further influence the manner and order in which videos are rendered in a search query.

In another aspect, recommendation component 704 can recommend specific segments of a video to a user as opposed to an entire video. According to this aspect, recommendation component 704 can recommend one or more segments of a video associated with relatively higher user engagement scores than other segments of the video. Recommendation component 704 can also recommend video segments from multiple videos associated with relatively high user engagement scores. For example, recommendation component 704 can identify a set of video segments to recommend to a user from various different videos, where each video segment included in the set has a user engagement score of N or above (where N is a number).

Figure 8:
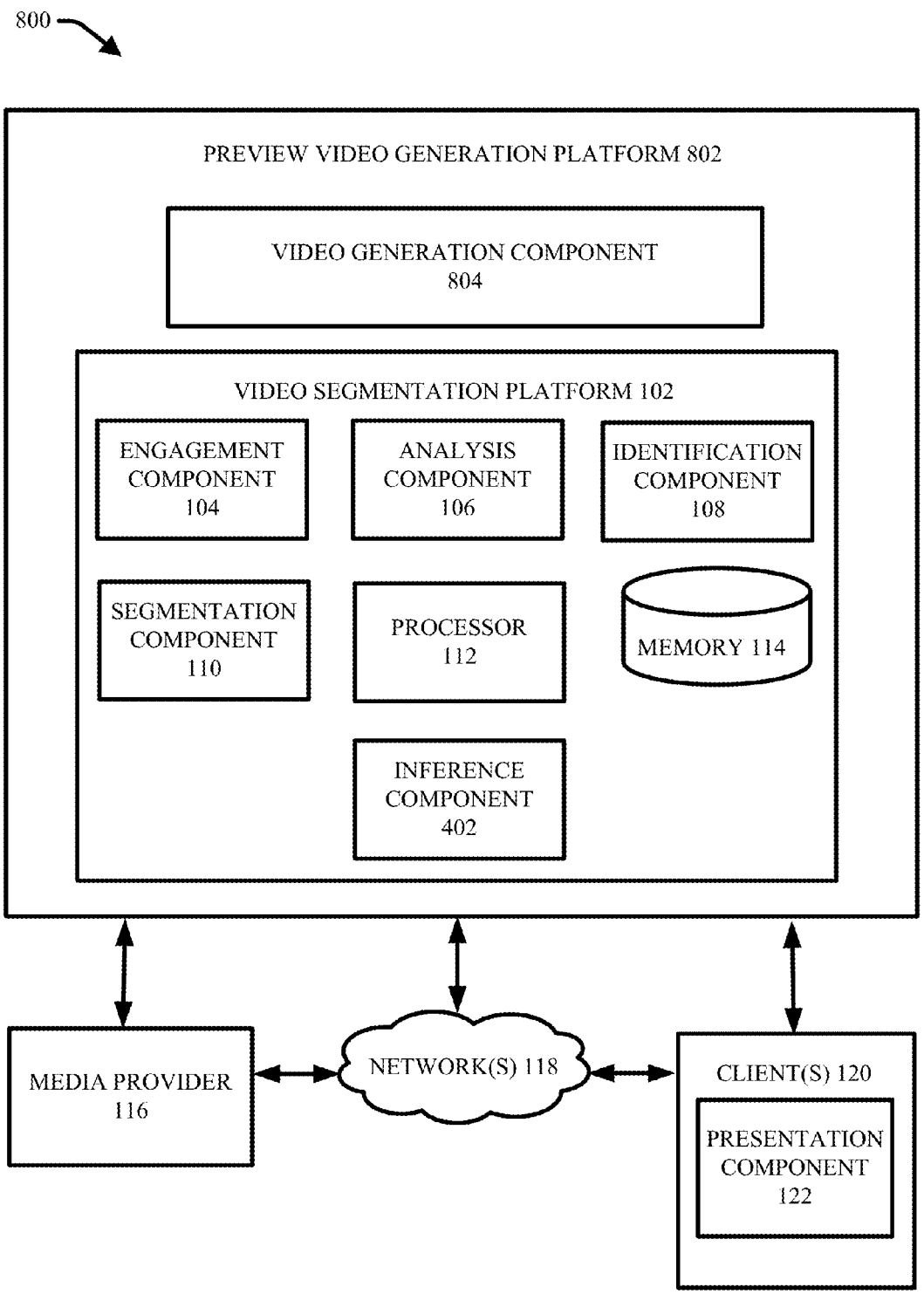
FIG. 8 illustrates an example system that facilitates generating a preview or summary video for a video based on user engagement scores associated with respective segments of the video in accordance with various aspects and embodiments described herein.

FIG. 8 presents a system 800 that facilitates generating a preview or summary video for a video based on user engagement scores associated with respective segments of the video. System 800 includes a video generation platform 802 that includes a video generation component 804. Video generation component 804 can function in similar manner to thumbnail component 504. For example, video generation component 804 can identify segments of a video having relatively higher user engagement scores than other segments of the video. In an aspect, video generation component 804 identifies the top R segments of a video having the highest user engagement scores associated therewith (e.g., identifies the top 10 segments of the video associated the 10 highest user engagement scores). However, rather than generating thumbnails from the engaging segments, video generation component 804 can extract the engaging segments of the video and join the extracted segments to generate a shortened version of the video. In an aspect, the shortened version of the video can be used as a preview or trailer for the video.

Figure 9:
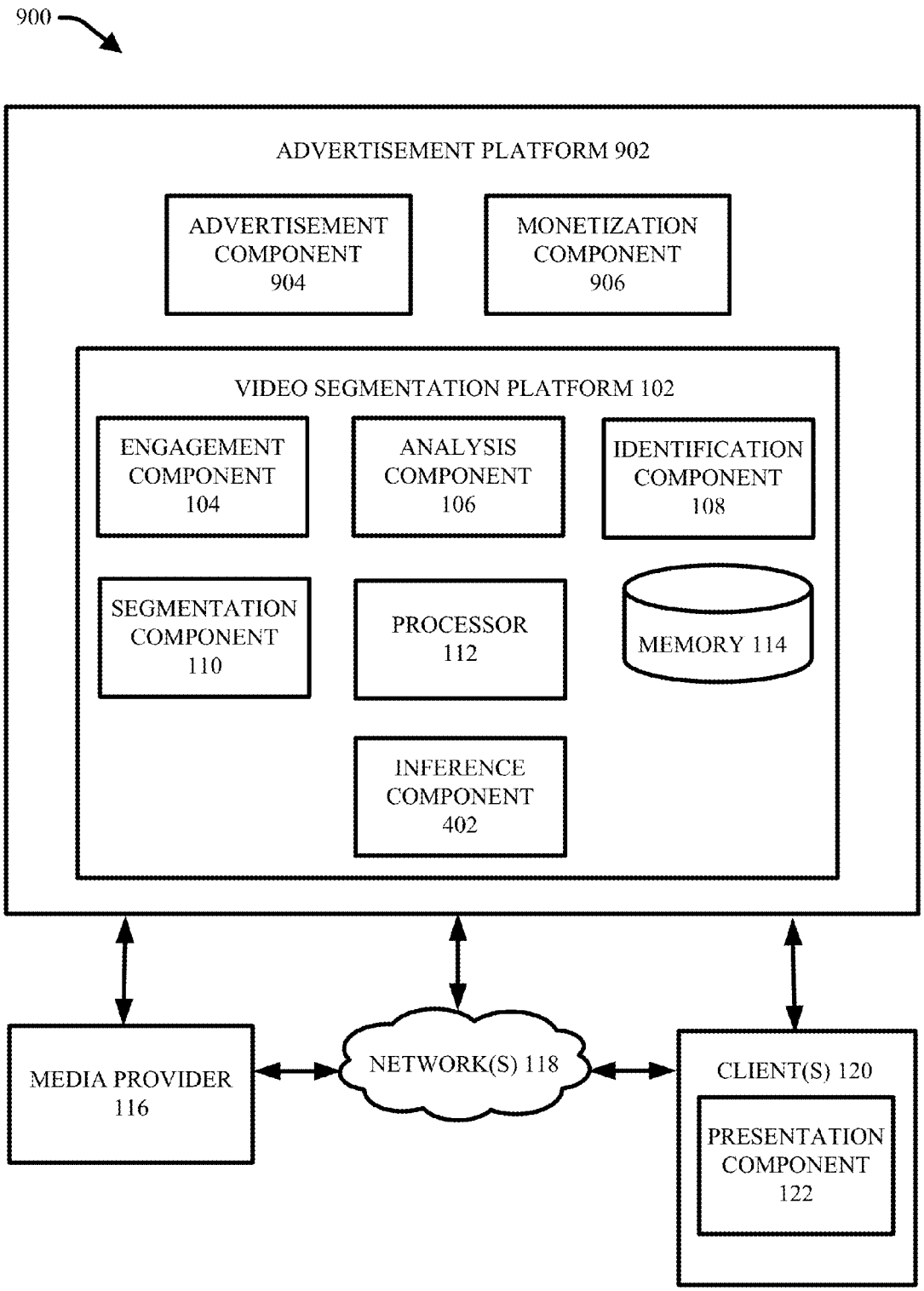
FIG. 9 illustrates an example system that facilitates associating advertisements with segments of videos and charging for the advertisements based on user engagement scores associated with the respective segments of the videos in accordance with various aspects and embodiments described herein.

FIG. 9 presents a system 900 that facilitates associating advertisements with segments of a video and charging for advertisement placement with respective segments of the video based on user engagement scores associated with the respective segments of the video. System 900 includes an advertisement platform 902 that includes advertisement component 904 and charging component 906. In an aspect, advertisement component 904 can identify segments of a video having relatively higher user engagement scores than other segments of the video and associate advertisements with the segments of the video having the relatively higher user engagement scores. According to this example, advertisement component 904 can insert media advertisements (e.g., video advertisements, audio advertisements, still image advertisements, etc.) at the beginning or ending of a segment (or within the segment) associated with a relatively high user engagement score. Given the fact that users generally tend to be engaged with segments of a video associated with relatively higher user engagement scores, advertisement component 904 can predict that an advertisement associated with those segments will likely be viewed by the engaged users.

In an aspect, advertisement component 904 can identify segments of a video having relatively higher user engagement scores than other segments of the video with respect to specific user types (e.g., based on user demographics, user preferences, user social affiliations, user watch history, etc.). Advertisement component 904 can further select advertisements targeted for a particular user type and associate those advertisements with segments of a video having relatively high user engagement scores for the particular user type. For example, advertisement component 904 can identify first segments of a video that are associated with high user engagement scores for a young audience and second segments of the same video that are associated with high user engagement scores for an older audience. Advertisement component 904 can then associate advertisements with the first segments of the video that are geared toward a young audience and associate advertisements with the second segments of the video that are geared toward an older audience.

Charging component 906 is configured to facilitate charging for association of advertisements with segments of a video associated with relatively higher user engagement scores than other segments of the video. For example, as noted above, when an advertisement is displayed at the beginning, middle, or ending of a segment that is popular amongst a plurality of users, as reflected in an average user engagement score associated with that segment, the advertisement is likely to be viewed by the engaged users. Accordingly, advertisers would prefer to have their advertisements placed in association with video segments having relatively high user engagement scores. Charging component 906 is configured to implement a charging scheme that charges advertisers more money for ensuring that their advertisements are associated with a video segment having a relatively high user engagement score. In an aspect, the higher the user engagement score for a particular segment, the more money charging component 906 can require for association of an advertisement with the segment.

Figure 10:
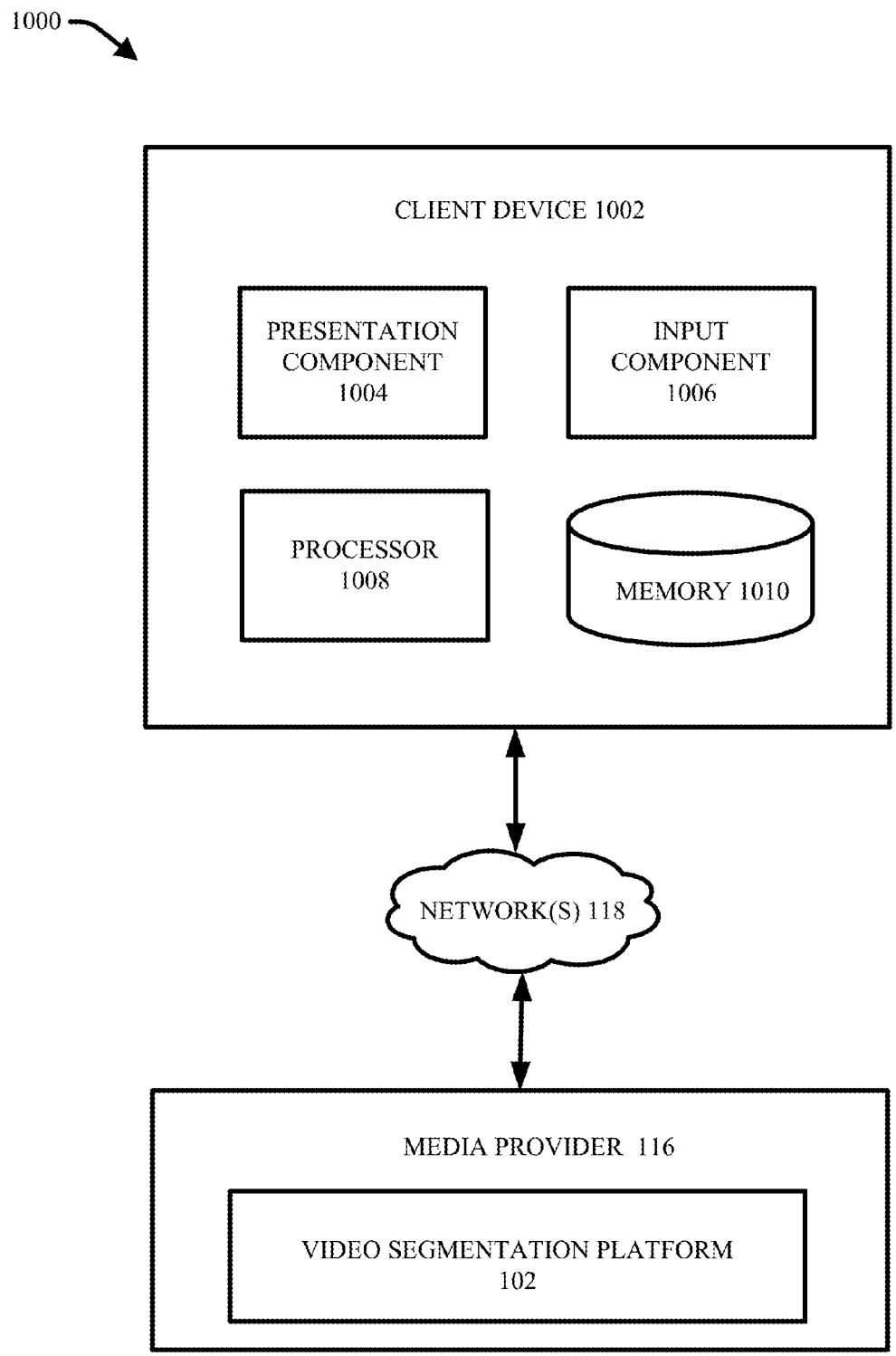
FIG. 10 illustrates another example system for segmenting a video based on user engagement in respective segments of the video in accordance with various aspects and embodiments described herein.

FIG. 10 presents another system 1000 for segmenting a video based on user engagement levels in respective segments of the video. System 1000 includes same features and functionalities of other systems described herein. Repetitive description of like elements employed in respective embodiments of systems and interfaces described herein are omitted for sake of brevity Similar to systems 100 and 400-800 described supra, system 1000 includes client device 1002, one or more networks 118, and media provider 1016. In system 1000, media provider 1016 is depicted including video segmentation platform 102. Client device 1002 includes presentation component 1004 and input component 1006. Client device 1002 can include memory 1010 for storing computer executable components and instructions and processor 1008 to facilitate operation of the instructions (e.g., computer executable components and instructions).

Presentation component 1004 can include features and functionalities described with reference to presentation component 122. Presentation component 1004 can generate and present a user interface at client device 120 that presents media to a user. In an aspect, presentation component 1004 presents video to a user via the user interface using a video player associated with client device 1002 that allows a user to control the playing of the video. In some aspects, media presented to a user at client device 1002 is downloaded or streamed from media provider 116.

Presentation component 1004 can present content viewing options for use with any suitable type of client device configured to interface with a media provider 116 and/or video segmentation platform 102. For example client device 1002 can include a mobile phone, a tablet computer, a desktop computer, a server system, a personal computers, a cable set top box, a satellite set top box, a cable modem, a television set, an internet-enabled television, a television computer device media extender device, a video cassette recorder device, a blu-ray device, DVD (digital versatile disc or digital video disc) device, a compact disc device, a video game system, an audio/video receiver, a radio device, a portable music player, a navigation system, a car stereo, etc.

The respective devices listed above (and additional devices suitable for interfacing with media provider 116 and/or video segmentation platform 102) often have different capabilities and limitations (e.g., screen size, decoders . . . ). In an aspect, presentation component 1004 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 1004 can generate user options to account for variations in device functionality and available bandwidth for consumption and rendering of media content.

In view of the above, presentation component 1004 can present media content in various formats and/or in accordance with various display mediums. In particular, presentation component 1004 can adapt and optimize display of media control options and media content based on respective client devices. For example, presentation component 1004 can present a section of video in a format such as H.263, H.264 AVC, MPEG-4 SP, VP8, or other suitable format based on the client device 120. In yet another example, presentation component 1004 can present an audio of a video in formats such as for example AAC LC/LTP, HE-AACv1(AAC+), HE-AACv2 (enhanced AAC+), AMR-NB, AMR-WB, FLAC, MP3, MIDI, Vorbis, PCM/WAVE, etc.

In an aspect, presentation component 1004 can automatically configure or present user options to consume video based on encoding parameters such as video resolution, video frame rate, video bit rate, video codec, audio codec, audio channels, audio bit rate, etc. Thus presentation component 1004 can choose a format to consume content that best suits capabilities of specific consumption mediums, available bandwidth, file size, processing capabilities, screen resolution, screen size, available encoders, available decoders, etc.

Input component 1006 facilitates receiving user input regarding engagement or interest in segments of a video played at client device 1002. Input component 1006 can include hardware and/or software that facilitates capturing user signals at client device 1002 indicating user engagement in video displayed at a user interface of client device 1002. For example, input component 1006 can include an input device (e.g., a mouse, a touch screen, a motion sensor, a proximity sensor, a gaze detection device, microphone, etc.) and/or software that analyzes an action captured by the input device to determine either an intention of the action (e.g., select, play, rewind, pause, seek forward, etc.) or an object on the user interface which the action is directed. Input component 1006 can also include voice to text software and/or hardware that facilitates capturing and interpreting user voice commands and sounds at client device 1002. Client device 1002 can further transmit or otherwise provide information regarding user input captured at client device 1002 related to user engagement in a video to video segmentation platform 102 for processing thereof.

Figure 11:
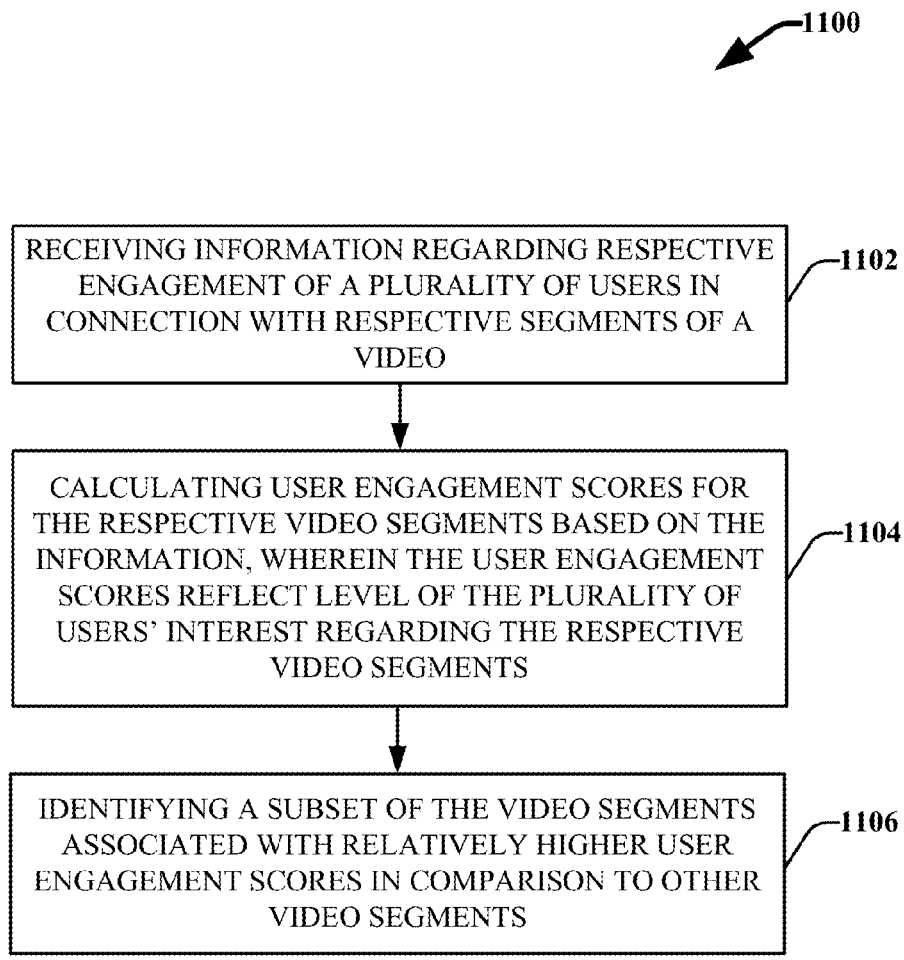
FIG. 11 is flow diagram of an example method for segmenting a video based on user engagement in respective segments of the video in accordance with various aspects and embodiments described herein.
Figure 12:
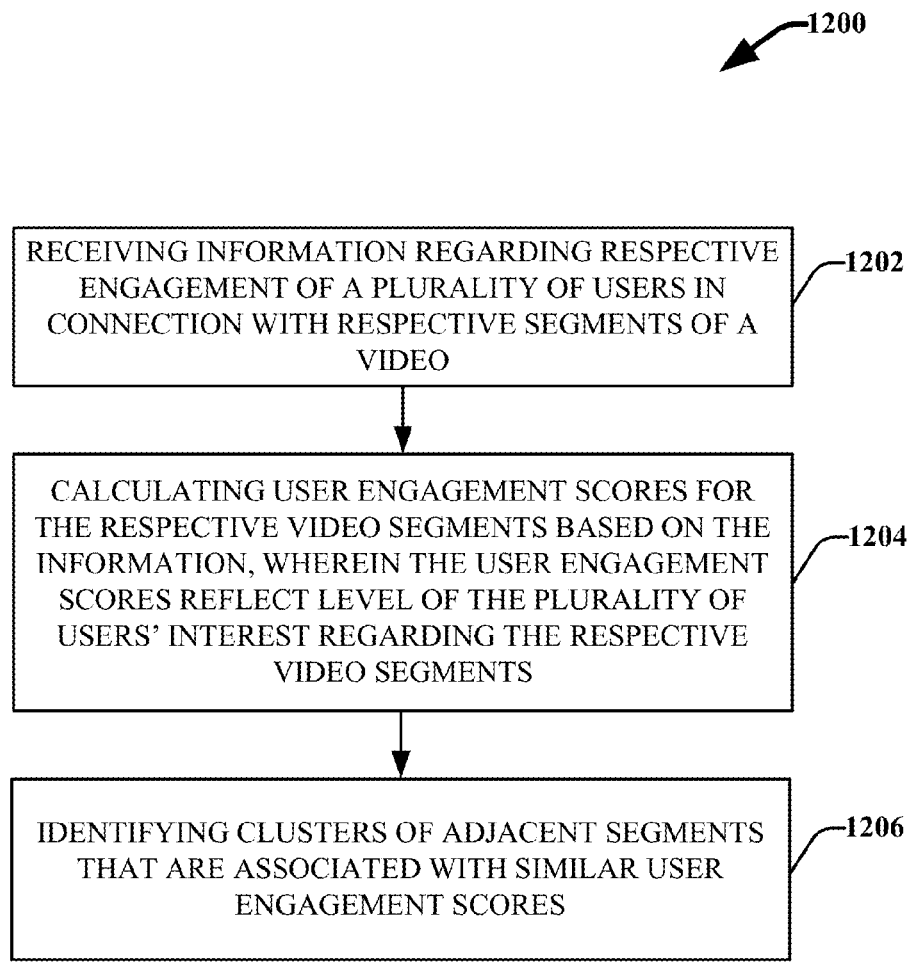
FIG. 12 is flow diagram of another example method for segmenting a video based on user engagement in respective segments of the video in accordance with various aspects and embodiments described herein.
Figure 13:
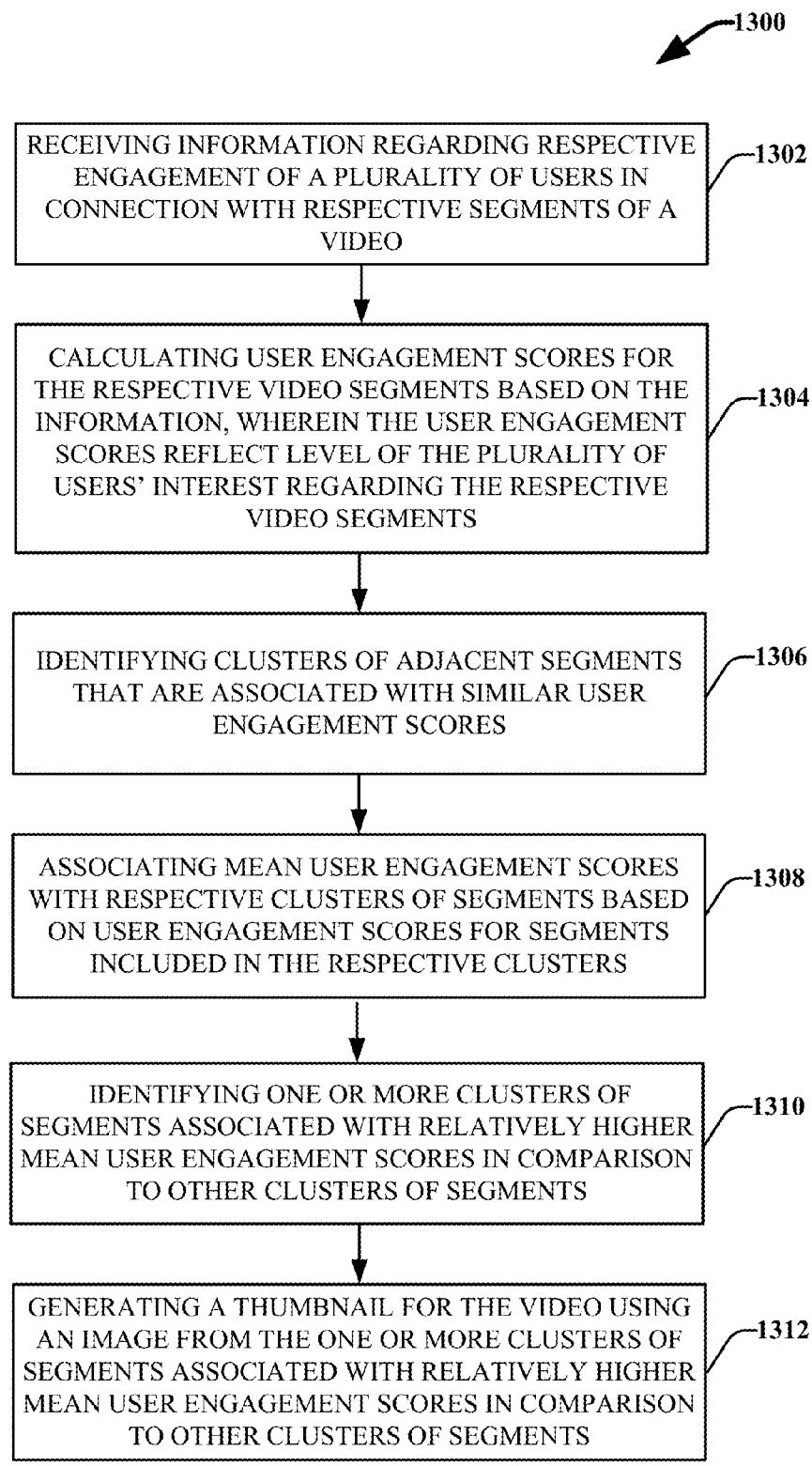
FIG. 13 is flow diagram of another example method for segmenting a video based on user engagement in respective segments of the video in accordance with various aspects and embodiments described herein.

In view of the example systems and/or devices described herein, example methods that can be implemented in accordance with the disclosed subject matter can be further appreciated with reference to flowcharts in FIGS. 11-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 11 illustrates a flow chart of an example method 1100 for segmenting a video based on user engagement in respective segments of the video, in accordance with various aspects and embodiments described herein. At 1102, information is received regarding respective engagement of a plurality of users in connection with respective segments of a video (e.g., using engagement component 104). At 1104, user engagement scores are calculated for the respective video segments based on the information, wherein the user engagement scores reflect level of the plurality of users' interest regarding the respective video segments (e.g., using analysis component 106). At 1106, a subset of the video segments associated with relatively higher user engagement scores in comparison to other video segments are identifies (e.g., using identification component 108).

FIG. 12 illustrates a flow chart of another example method 1200 for segmenting a video based on user engagement in respective segments of the video, in accordance with various aspects and embodiments described herein. At 1202, information is received regarding respective engagement of a plurality of users in connection with respective segments of a video (e.g., using engagement component 104). At 1204, user engagement scores are calculated for the respective video segments based on the information, wherein the user engagement scores reflect level of the plurality of users' interest regarding the respective video segments (e.g., using analysis component 106). At 1206, clusters of adjacent segments having similar user engagement scores are identified. (e.g., using identification component 108).

FIG. 13 illustrates a flow chart of another example method 1300 for segmenting a video based on user engagement in respective segments of the video, in accordance with various aspects and embodiments described herein. At 1302, information is received regarding respective engagement of a plurality of users in connection with respective segments of a video (e.g., using engagement component 104). At 1304, user engagement scores are calculated for the respective video segments based on the information, wherein the user engagement scores reflect level of the plurality of users' interest regarding the respective video segments (e.g., using analysis component 106). At 1306, clusters of adjacent segments having similar user engagement scores are identified. (e.g., using identification component 108). At 1308, mean user engagement scores are associated with respective clusters of segments based on user engagement scores for segments included in the respective clusters (e.g., using analysis component 106 and/or identification component 108). At 1310, one or more clusters of segments associated with relatively higher mean user engagement scores in comparison to other clusters of segments are identified (e.g., using identification component). At 1312, a thumbnail is generated for the video using an image from the one or more clusters of segments associated with relatively higher mean user engagement scores in comparison to other clusters of segments (e.g., using thumbnail component 504).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 14:
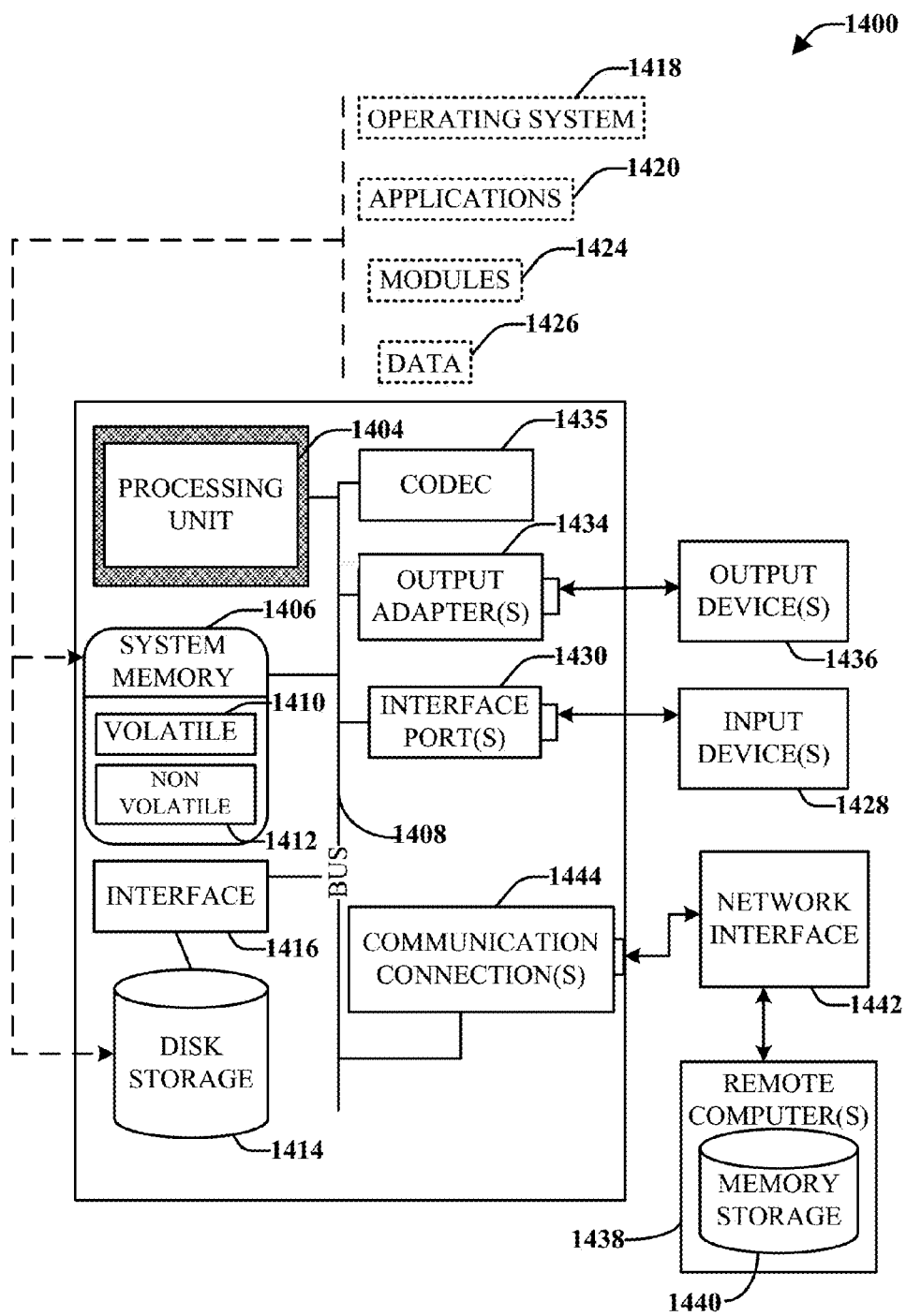
FIG. 14 is a schematic block diagram illustrating a suitable operating environment in accordance with various aspects and embodiments.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 14144), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
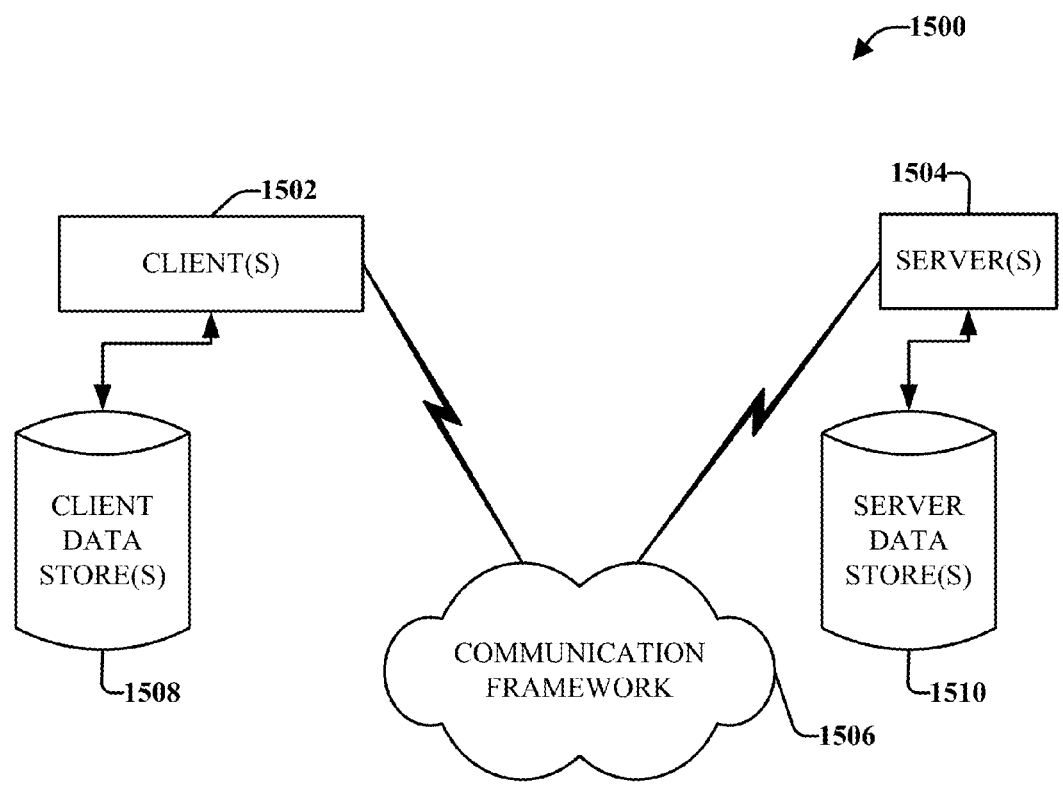
FIG. 15 is a schematic block diagram of a sample-computing environment in accordance with various aspects and embodiments.

Referring now to FIG. 15, there is illustrated a schematic block diagram of a computing environment 1500 in accordance with this disclosure. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1508 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory having stored thereon computer executable instructions; and
    a processor that executes the computer executable instructions which cause the processor to:
        receive occurrence information of a plurality of different types of engagement actions taken by a plurality of users in connection with each of a plurality of segments of a video, wherein each of the plurality of different types of engagement actions corresponds to a user input provided via a user interface used to present the video;
        calculate user engagement scores for each of the plurality of video segments based on a weighted combination of the occurrence information corresponding to each of the plurality of different types of engagement actions, wherein the user engagement scores reflect a level of the plurality of users' interest regarding a particular segment of the plurality of video segments;
        identify a subset of video segments of the plurality of video segments associated with higher user engagement scores in comparison to other video segments of the plurality of video segments;
        associate numerical mean values of the user engagement scores with respective groups of the video segments of the plurality of video segments based on user engagement scores for the video segments included in the respective groups; and
        recommend at least one group of the video segments from the video to a user based on the numerical mean value of user engagement scores for the respective groups of the video segments.

2. The system of claim 1, wherein the computer executable instructions further cause the processor to segment the video into N groups of segments based on points in the video where segments of the subset are located, wherein N is a number greater than or equal to 2.

3. The system of claim 1, wherein the computer executable instructions further cause the processor to:
identify clusters of adjacent segments that are associated with user engagement scores having a defined similarity; and
segment the video into N groups of segments based on the clusters, wherein N is a number greater than or equal to 2.

4. The system of claim 1, wherein the computer executable instructions further cause the processor to generate thumbnails for the video based on images respectively associated with the subset of video segments.

5. The system of claim 1, wherein the computer executable instructions further cause the processor to identify a cluster of segments that are adjacent to one another and that are associated with user engagement scores having a defined level of similarity.

6. The system of claim 5, wherein the computer executable instructions further cause the processor to generate a thumbnail for the video based on an image associated with segments of the cluster.

7. The system of claim 1, wherein the computer executable instructions further cause the processor to calculate the user engagement scores based at least in part on a number of times respective users of the plurality of users forward seek past the respective video segments while playing the video.

8. The system of claim 1, wherein the computer executable instructions further cause the processor to calculate the user engagement scores based at least in part on a number of times respective users of the plurality of users backward seek to arrive at the respective video segments while playing the video.

9. The system of claim 1, wherein the computer executable instructions further cause the processor to calculate the user engagement scores based at least in part on a number of times users of the plurality of users bookmarked the respective video segments while watching the video.

10. The system of claim 1, wherein the computer executable instructions further cause the processor to calculate the user engagement scores based at least in part on a number of comments respective users of the plurality of users provided for respective video segments while watching the video.

11. The system of claim 1, wherein the computer executable instructions further cause the processor to calculate the user engagement scores based at least in part on a number of times respective users of the plurality of users stopped the video at the respective video segments while watching the video.

12. The system of claim 1, wherein the computer executable instructions further cause the processor to calculate the user engagement scores based at least in part on a number of times respective users of the plurality of users paused the video and subsequently resumed playing the video at the respective video segments.

13. The system of claim 1, wherein the computer executable instructions further cause the processor to:
extract the subset of segments; and
generate a new video comprising the subset of segments.

14. The system of claim 1, wherein the computer executable instructions further cause the processor to receive engagement information regarding a plurality of users associated with at least one of: a common social circle, a common demographic, or a common interest in one or more topics.

15. A method comprising:
using a processor to execute the following computer executable instructions stored in a memory to perform the following acts:
receiving occurrence information of a plurality of different types of engagement actions taken by a plurality of users in connection with each of a plurality of video segments of a video, wherein each of the plurality of different types of engagement actions corresponds to a user input provided via a user interface used to present the video;
calculating user engagement scores for each of the plurality of video segments based on a weighted combination of the occurrence information corresponding to each of the plurality of different types of engagement actions, wherein the user engagement scores reflect a level of the plurality of users' interest regarding a particular video segment of the plurality of video segments;
identifying a subset of video segments of the plurality of video segments associated with higher user engagement scores in comparison to other video segments of the plurality of video segments;
associating numerical mean values of the user engagement scores with respective groups of the video segments of the plurality of video segments based on user engagement scores for the video segments included in the respective groups; and
recommending at least one group of the video segments from the video to a user based on the numerical mean value of user engagement scores for the respective groups of the video segments.

16. The method of claim 15, further comprising segmenting the video into N groups of segments based on points in the video where segments of the subset are located, wherein N is a number greater than or equal to 2.

17. The method of claim 15, further comprising:
identifying clusters of adjacent segments that are associated with the user engagement scores having a defined level of similarity;
segmenting the video into N groups of segments based on the clusters, wherein N is a number greater than or equal to 2.

18. The method of claim 17, further comprising identifying one or more groups of segments associated with higher mean value user engagement scores in comparison to other groups of segments.

19. A non-transitory computer-readable storage medium comprising computer-readable instructions that, in response to execution, cause a computing system to perform operations, comprising:
receiving occurrence information of a plurality of different types of engagement actions taken by a plurality of users in connection with each of a plurality of video segments of a video, wherein each of the plurality of different types of engagement actions corresponds to a user input provided via a user interface used to present the video;
calculating user engagement scores for each of the plurality of video segments based on a weighted combination of the occurrence information corresponding to each of the plurality of different types of engagement actions, wherein the user engagement scores reflect a level of the plurality of users' interest regarding a particular video segment of the plurality of video segments;

identifying a subset of video segments of the plurality of video segments associated with higher user engagement scores in comparison to other video segments of the plurality of video segments; and associating numerical mean values of user engagement scores with respective groups of the video segments of the plurality of video segments based on user engagement scores for video segments included in the respective groups; and recommending at least one group of the video segments from the video to a user based on the numerical mean value of user engagement scores for the respective groups of the video segments.

20. The non-transitory computer-readable storage medium of claim 19, wherein the operations further comprise:

identifying one or more clusters of segments associated with higher mean user engagement scores in comparison to other clusters of segments.

* * * * *